United States Patent [19]

Popp

[11] 4,079,913
[45] Mar. 21, 1978

[54] MODULATING VALVE SUB-ASSEMBLY

[75] Inventor: Roger C. Popp, Chesaning, Mich.

[73] Assignee: Midland-Ross Corporation, Cleveland, Ohio

[21] Appl. No.: 745,044

[22] Filed: Nov. 26, 1976

[51] Int. Cl.² .............................................. F16K 11/16
[52] U.S. Cl. .................................. 251/77; 137/627.5; 251/86
[58] Field of Search .................. 137/627.5; 251/77, 86

[56] References Cited
U.S. PATENT DOCUMENTS 3,512,552  5/1970  Dobrikin et al. ................... 137/627.5
3,752,190  8/1973  Brake ................................. 137/627.5

Primary Examiner—Robert G. Nilson
Attorney, Agent, or Firm—Woodrow W. Portz

[57] ABSTRACT

Described herein is a valve sub-assembly which, e.g., functions as a portion of a modulating valve preferably subjected to operating pressures of less than two atmospheres. This sub-assembly is especially designed to reduce hysteresis in the response of the valve to signal media. Hysteresis reduction is achieved through a departure from conventional sealing mechanism designs which achieves a reduction in the friction involved in the operation of conventional modulating valves.

6 Claims, 6 Drawing Figures

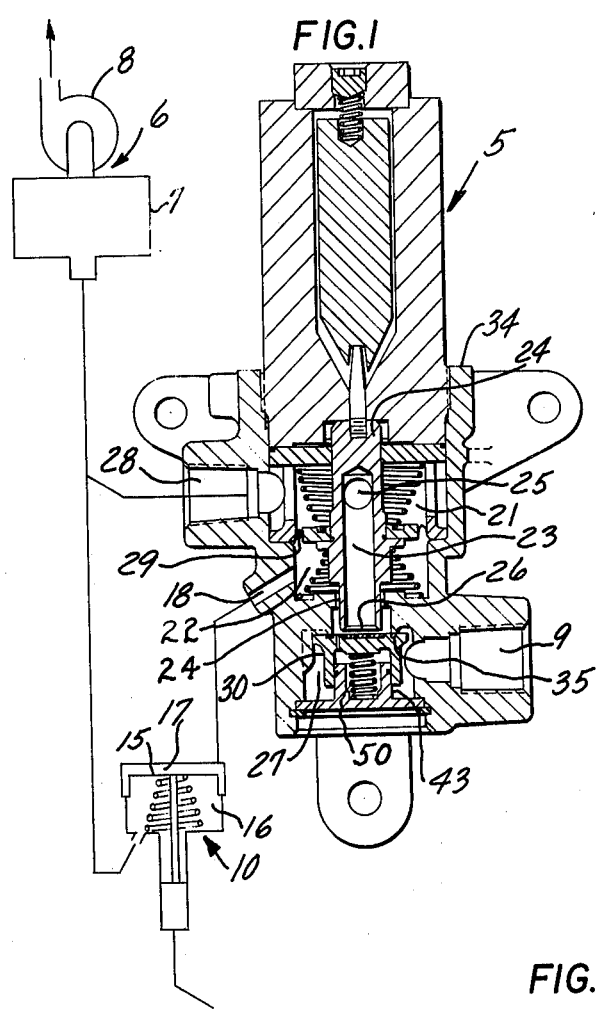
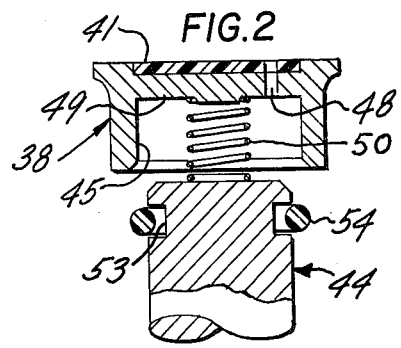
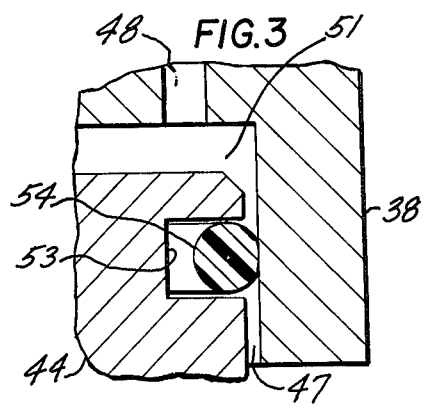
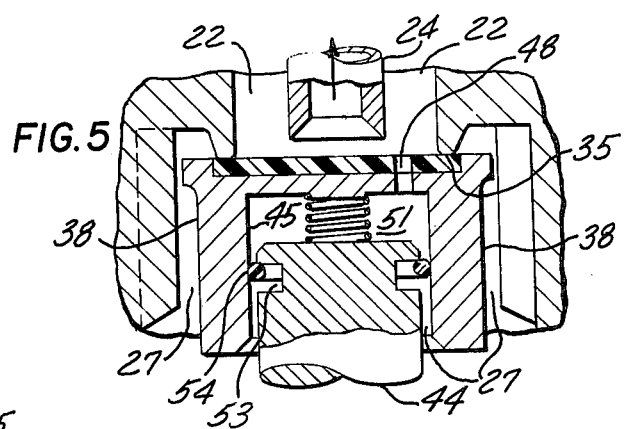
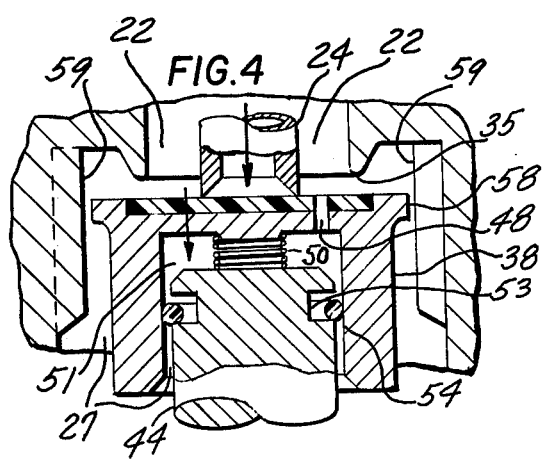
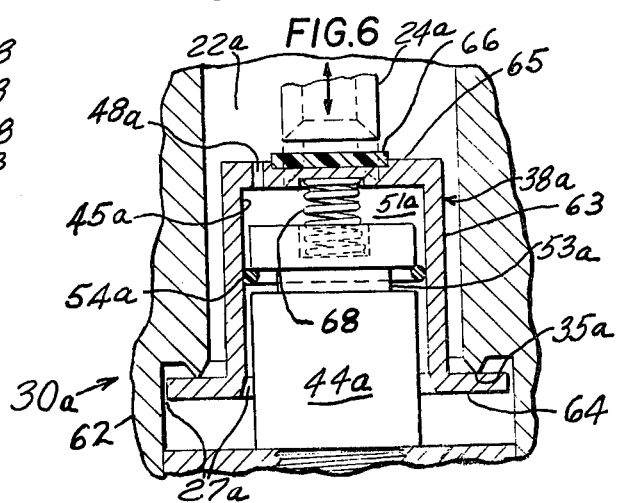

MODULATING VALVE SUB-ASSEMBLY

BACKGROUND OF THE INVENTION

The present invention has utility especially in the field of modulating valves which operate with pressure differences of no greater than about two atmospheres. It is described herein as a portion of a solenoid control valve which issues an output control pressure produced as an intermediate pressure between a substantially constant higher pressure and a substantially constant lower pressure supplied to the solenoid valve. The solenoid and spring arrangements of the valve effect output pressures corresponding quantitatively to the level of electrical activation of the solenoid. Such a valve when energized by an electrical source and a vacuum source on a tow vehicle to operate a vacuum booster on a trailer, provides an output control pressure developed from atmosphere as the higher pressure, and engine vacuum as the lower pressure.

Such a valve is typically arranged so that at normal inoperative conditions, the output control pressure assumes the level of one of the two supply pressures, e.g., in the valve to be described, the engine vacuum pressure by way of an intervening vacuum reservoir. Obviously, modulation of the control pressure is thus effected by leaking air or other fluid from the higher pressure source into control pressure region of the valve while shutting or substantially reducing connection of the control pressure region with the vacuum source.

The main problem dealt with by this invention is that of providing valve mechanism within a modulating valve for releasing the higher pressure fluid into the lower-pressured control pressure region with the least possible "hysteresis" in the valve. Hysteresis is herein regarded as effort expended within the valve to overcome lag in operation due to friction of relatively moving parts. Hysteresis is particularly to be avoided in control valves at low level control efforts.

Conventional O-ring seal configurations typically constrain the seal ring by tight entrapment to obtain the compression of the O-ring necessary for sealing mating surfaces. Such construction is accompanied by friction sought to be eliminated by this invention. Moreover, a ratio of normal manufacturing tolerances of valve parts to O-ring cross section in the conventional configuration results in a wide highly undesirable variation in seal ring compression and in the friction of the ring with the cooperating sealing valve portion. Such frictional variation is especially significant in the low level control efforts of modulating valves and in the manufacturing of valves to uniform performance.

SUMMARY OF THE INVENTION

This invention resides in a valve sub-assembly especially adapted for forming a portion of a modulating valve of the type arranged for receiving supply fluids at two different pressure levels. Such a valve produces a modulated control pressure in which the valve sub-assembly of the invention effects a seal only after an element thereof moves toward the lower pressure region of the valve. Because of the dependence of the invention on a small degree of outside circumferential deformation in elastomeric O-rings for success, the pressure of supply fluid cannot exceed about two atmospheres.

In its most general aspects, the valve sub-assembly comprises: a normally stationary mandrel extending from its supported end anchored, e.g., in the valve housing in a normally higher pressure region toward its distal end and a lower pressure control region into concentric relation with an annular fixed valve seat facing toward the higher pressure region and outlining a passageway between the higher pressure region and the lower pressure region; a cup-shaped valve member having an end wall at the end of the member toward the lower pressure region, a cylindrical wall in telescopic relation with a portion of the mandrel; and a concentric annular seating surface facing towards the valve seat. A usual portion of such a valve is a plunger, such as the solenoid plunger which may move through the seat to engage the member end wall and move it away from the seat to allow the high pressure fluid to enter the lower pressure control region. A spring or other resilient medium stands between the member and the mandrel to urge the member to seating position. With the above background in mind, it is obvious that the cup-shaped member is the essential moving part other than the plunger.

A seal between the cylindrical overlapping portions of the mandrel and surrounding sidewall of the member by an O-ring in circumferentially compressed engagement can be established with the inner cylindrical surface of the widewall and one side of an over-sized groove in the outer surface of the mandrel within which the O-ring is received.

The unique features of this sub-assembly are found in a construction of the O-ring, the member and mandrel that causes the O-ring to travel essentially with the member in its seating and unseating strokes. Primarily the features are: (1) the O-ring has a free circumference greater but not more than about five percent greater (with present elastomeric compounds), than the inner circumference of the member sidewall so that the O-ring will tightly engage the wall without circumferential buckling; (2) the groove in the mandrel is wider than the thickness of the O-ring by amount less than the length of the seating and unseating strokes of the cup-shaped member; (3) large unconventional clearances between the member and the mandrel that permit misaligned movement and wobble of the valve member and large and easily-met manufacturing tolerances without sacrifice of function or efficiency; (4) clearances that permit such wobble motion of the member as to allow its realignment in alternating seating with either the valve seat or the plunger extension of the solenoid; and (5) a deep O-ring groove in the mandrel which allows free lateral shifting of the O-ring therewithin during wobble eccentric adjustment of the member alternately to seating on the above named valve seat or seating on the end of the solenoid plunger extension.

DESCRIPTION OF THE DRAWING

FIG. 1 is a view in section taken along the longitudinal axis of a solenoid-actuated modulating valve showing schematically a source of vacuum and a vacuum booster unit connected with the valve, and the portion of the valve comprising the sub-assembly of the invention.

FIG. 2 is a fragmentary exploded view in section of elements of the sub-assembly.

FIG. 3 is a fragmentary view in section of elements of the sub-assembly especially illustrating the relation therewith of an O-ring.

FIG. 4 is a fragmentary view in section of elements of a valve in relation with various portions of the sub-assembly during a pressure-modulating operation.

FIG. 5 is a fragmentary view in section showing the valve items of FIG. 4 as positioned during an inoperative condition of the valve.

FIG. 6 is a fragmentary view of a modified sub-assembly with some parts in section taken along the longitudinal axis of a valve.

DESCRIPTION OF PREFERRED EMBODIMENTS

FIG. 1 illustrates a typical environment for the invention in which a solenoid type regulating valve 5 is subjected to two supply pressures provided in one instance by a vacuum source 6 consisting, e.g., of a reservoir 7 and a pump 8 in communication with a supply port 28, and atmosphere in direct communication with a supply port 9. Typical of devices to be controlled by the valve 5 is a vacuum booster unit 10 comprising a springloaded diaphragm 15 subjected to vacuum from the vacuum source 6 in its chamber 16, and to pressure or vacuum in its chamber 17 in communication with the control pressure port 18 of the valve 5. At deactivation, the vacuum pressures in chambers 16 and 17 are equal since the valve 5 is constructed to permit the lower pressure chamber 21 of the valve 5 to be in communication with the control pressure chamber 22. Such communication is obtained through the bore 23 of a solenoid-reciprocated plunger 24 having an opening 25 in chamber 21 and another opening or open end 26 of the plunger in contiguous relation with the chamber 22.

Hence, if air from a higher pressure region 27 of the valve contiguous with inlet port 9 be mixed with air at supply vacuum pressure of chamber 21 and the lower supply pressure port 28 contiguous therewith, a control pressure is developed within the chamber 22 at a pressure value between those existing at ports 9 and 28. Chambers 21 and 22 are separated by an air-tight diaphragm 29.

The sub-assembly of this invention, indicated generally by the numeral 30, is a mechanism by which the higher pressure air of chamber 27 is admitted to the control chamber 22 to establish a pressure within the control chamber 22 which is modulated with respect to lower and higher supply pressures at ports 9, 28 respectively. It is important to note that the valve housing 34 provides a valve seat 35 facing away from the lower supply pressure region 21 and the variable-pressure control region 22. An element of the assembly, i.e., a cup-shaped valve member 38 normally engages the valve seat when the valve does not call for flow of air from its higher pressure region 27 to its medial control-pressure region 22.

When the arrangement of the modulating valve is such that the thrust means for unseating the member 38 is hollow and fluid conducting, member 38 preferably includes a resilient lamina 41 secured to or within the end surface of the member as shown in FIG. 2 to form a more effective seal during valve-function engagement of the member 38 with a hollow plunger, such as plunger 24.

An essential portion of the assembly 30 is a guide mandrel, such as the hollow cylindrical boss 43 of FIG. 1 or the solid mandrel 44 of FIGS. 2 to 5 preferably located in coaxial relation with the plunger. The exterior cylindrical surface of the mandrel 43, 44 in any case should be sufficiently smaller in diameter than the diameter of the internal cylindrical surface 45 of the sidewall member 38 to form a clearance 47 which permits free wobble or rocking motion of the member 38 relative to the mandrel when positioned in telescoping relationship as shown in FIGS. 3 to 5. The recess of the hollow boss 43 receives a spring 50 seated therein and against surface of end wall 49 to urge member 38 toward the seat 35. The member 38 has an aperture 48 through its end wall 49 including the resilient insert 41 for equalizing the pressure within an otherwise sealed region 51 enclosed between the member 38 and the mandrel 43 or 44. Aperture 48 is located radially outside the portion of the end wall 49 engaged by the plunger. The pressure of region 51 enclosed around the mandrel by the member 38 is thus the same as that of region 22 at all times. The end wall 49 comprises an outer annular portion which forms abutment means for engaging the valve seat 35. A central portion of the end wall is engaged during valve operation by the plunger 24.

The mandrel 44 is necessarily provided with a circular peripheral groove 53 for receiving an annular sealing ring, e.g., and an O-ring 54, of resilient elastomeric or rubber-like material and uniform cross section. The groove is preferably of greater depth than the radial thickness of the material of the O-ring. The width of the groove 53 in an axial direction is dependent on the stroke of thrust means, such as the plunger 24, which reciprocates the member 38. Accordingly, the width of the groove 53 in an axial direction is wider than the axial thickness of the O-ring 54 by a difference in dimension that is less than the reciprocating movement of the member 38 as caused by a reciprocator, such as the plunger 24. The stroke of the plunger would consequently have a length greater than the sum of the reciprocable ambit of the member and the gap between the plunger and the end surface of the member normally maintained at inactivated condition of the valve 5, or other valve in which the sub-assembly is incorporated.

Of critical importance to the invention is that the outer circumference of the O-ring 54 be slightly greater than the circumference of the inner cylindrical surface 45 of the member 38. Experience indicates that, in order to avoid circumferential buckling, the O-ring outer circumference should not be more than 5% greater than that of the member surface 45 on the basis of elastomeric compounds presently available. It is intended that when the ring 54 is placed in the groove 53 that the outer circumferential portion of the ring 54 will be compressibly mated in circumference to that of the surface 45 as the member 38 assumes substantial telescopic relation with the mandrel as shown in FIG. 3. Thus, with the sub-assembly 30 assembled for operation, as shown in FIGS. 1, 3, 4 and 5, is supported for traveling primarily with the cup-shaped member 38 because it is frictionally supported by surface 45 usually in free suspension within the groove 55 except at opposite ends of the ambit travel of the member 38. The clearance 47 and the groove 53 are copiously supplied with a grease-like lubricant to promote sealing and to minimize friction between the O-ring and the member 38 as relative movement occurs therebetween at opposite ends of the member ambit.

FIG. 4 illustrates that member 38 is being forced away from the seat 35 in downward greater telescoping relationship with the mandrel 44. The ring 54 is being carried by frictional contact with the inner cylindrical surface of member 38 against the lower side of the groove 53. Because of the opening 48, pressure is substantially equal in regions 22, 27 and 41 and there is consequently no pressure acting in either axial direction on the O-ring 54.

In FIG. 5, the plunger 24 is shown retracted in the direction of the arrow to the extent that there is clearance with the member 38 to allow the latter engage its seat 35. It is important to observe that the member 38 has carried the O-ring 54 to a position wherein it is seated against the upper side of the groove 53 and the surface 35. The pressure of region 27, being normally greater than that in the chamber 21, causes a pressure different to develop between the control region 22 and the region 27. Because of the presence of the opening 48, a pressure difference occurs at opposite sides of the O-ring 54 which urges the ring against the upper side of the groove to enhance sealing action. If the plunger 24 is now moved toward the member 38 to again unseat the member, pressure will be equalized within regions 22, 27 and 51 to allow the member 38 to carry the O-ring without any frictional resistance across the width of the groove 58 to a relationship of parts as depicted in FIG. 4.

It is important to note that the free movement of the ring in both directions across the groove 53 substantially eliminates friction (hence, valve hysteresis) in the operation of the sub-assembly 30.

Because of the facility of the member 38 to tilt or wobble in respect to the mandrel 44, the member 38 will accurately align itself with the end of the plunger 24 or the seat 35 even though the member engaging surfaces of these parts may not be manufactured accurately and do not occur in parallel planes. The ability of member 38 to tilt in accommodation to inaccuracies of construction of the valve may be attributed to large unconventional clearances in the construction of mating portions of the member 38 and the mandrel 44 and portions of the valve surrounding the member 38; and further to the support of the O-ring 54 by the inner surface of the member 38 and the freedom of movement therefor within the oversized groove 53.

As shown, the member 38 is given general or failsafe guidance, normally not required, by a circular flange 58 thereof in adjacent clearance relation with flutes 59 formed radially outwardly along the inner wall of the valve.

FIG. 6 depicts a modified sub-assembly 30a in accordance with the invention which differs from the earlier described embodiment primarily in the configuration of a valve member 38a and the consequent redeployment of the spaced ends of a plunger 24a and a mandrel 44a with respect to a valve seat 35a. The letter "a" is added to numerals indicating parts of similar function in the earlier described embodiment. As shown in FIG. 6, the mandrel 44a has a proximal portion fixed to a portion of the valve housing 62 within the higher pressure chamber 27a, and a distal portion extending inwardly of the control-pressure chamber 22a beyond the valve seat 35a. The plunger 24a is supported, e.g., in a manner described with respect to FIG. 1, for reciprocation toward and away from the distal end of the mandrel 44a.

The cup-like valve member 38a provides a cylindrical wall 63 in substantial telescoping relation with the mandrel 44a, a flange 64 extending radially outwardly from the wall 63 into radially overlapping engageable relation with the annular seat 35a, and a disc-like end wall 65 contiguous with the sidewall 63 providing a resilient seat 66 engageable by the plunger 24a and a spring seat along its inner surface for a spring 68 standing in a state of compression between the member 38a and the mandrel 44a. The same tolerance requirements or the lack thereof described with respect to the aforemention embodiment are observed in the structural interrelationships of the wall 63, the mandrel 44a, the groove 53a, and the O-ring 54a to bring about frictionless movements of the valve member 38a and floating support thereof, such as to enable it to tilt in accommodation to inaccurate alignments of the plunger 24a, the mandrel 44a, or the valve seat 35a in the same manner as hereinbefore described with respect to the earlier embodiment.

What is claimed is:

1. In a low hysteresis valve having a housing defining a first region of normally higher pressure, a second region of normally lower pressure, means connecting the two regions in fluid communication defining an annular valve seat facing away from the second region along a transaxial plane:

a cup-shaped valve member providing a disc-shaped end wall and an axially-extending sidewall of cylindrical inner surface connected to said end wall in coaxial relation therewith, said member comprising abutment means defining an annular seat-engaging surface facing said seat for engagement therewith;

thrust means for lifting said member away from said seat through a fixed maximum length of ambit;

a mandrel of circular cross section in fixed relation with the housing extending generally coaxialy inwardly of said sidewall at a clearance therewith permitting such tilting or eccentric movement of the member relative to said mandrel as to effect unrestricted complete seating of the member against the thrust means and said seat during alternate engagement therewith, the outer cylindrical surface of said mandrel defining a peripheral circular groove;

an annular sealing ring of resilient material received in said groove having a free outer diameter greater than the inside diameter of said sidewall to the extent that said ring does not circumferentially buckle when said mandrel and ring are positioned within said sidewall, and an inner diameter having a clearance with the inner diameter of the groove substantially equal to that of said mandrel with the inner surface of said sidewall to facilitate said tilting or eccentric motion of the member, said groove being of a width in the axial direction of the member exceeding the axial thickness of said ring, the difference in said ring thickness and said groove width being less than the length of said ambit;

resilient means for urging the member toward said seat; and passageway means through a portion of said member comprising said end wall for transfer of fluid between said lower pressure region and space within the member enclosed around a distal portion of the mandrel by said member portion and said sealing ring.

2. The valve of claim 1 wherein:

said thrust means is a reciprocal plunger housed in said lower pressure region in coaxial spaced relation with said mandrel with its distal end surface spaced from the distal end surface of said mandrel by a gap exceeding the sum of the length of said member ambit and the thickness of said member and wall, said end wall being positioned between said end surfaces.

3. The valve of claim 2 wherein:
said abutment means and member end wall are generally coincident with a common transaxial plane and said side wall extends from said plane in a direction away from said lower pressure region, and said mandrel and plunger are constructed and arranged to locate said distal end surfaces accordingly.

4. The valve of claim 2 wherein:
said sidewall extends from said abutment means toward or inwardly of said lower pressure region away from said higher pressure region to terminate in said end wall, and said mandrel and plunger are constructed and arranged to locate said distal end surfaces accordingly.

5. The valve of claim 2 wherein:
said resilient means is a spring standing in a state of compression within said member between said end wall and said mandrel.

6. The valve of claim 1 wherein:
said housing comprises guide means located at clearance radially outwardly from said member and aligned for guiding the member in an axial direction.

* * * * *